United States Patent [19]

Sweet

[11] 4,170,700

[45] Oct. 9, 1979

[54] METHOD FOR ACCELERATING SURFACE CURING OF ORGANOPOLYSILOXANE COMPOSITIONS

[75] Inventor: Edward Sweet, Blissfield, Mich.

[73] Assignee: SWS Silicones Corporation, Adrian, Mich.

[21] Appl. No.: 902,018

[22] Filed: Apr. 26, 1978

Related U.S. Application Data

[63] Continuation-in-part of Ser. No. 767,940, Feb. 11, 1977, abandoned.

[51] Int. Cl.$^2$ .............................................. C08G 77/06
[52] U.S. Cl. ........................................ 528/12; 528/33; 528/34; 528/38; 528/43; 525/102; 525/478
[58] Field of Search ................... 528/11, 12, 33, 34, 528/38, 43; 260/827

[56] References Cited

U.S. PATENT DOCUMENTS

| 3,408,325 | 10/1968 | Hittmair et al. | 528/11 |
| 3,644,434 | 2/1972 | Hittmair et al. | 528/33 |
| 3,923,736 | 12/1975 | Nitzsche et al. | 528/34 |

OTHER PUBLICATIONS

Remy, Treatise on Inorganic Chemistry, vol. I, pp. 440 to 442, Elsevier Publishing Co., N.Y. (1956).

*Primary Examiner*—Melvyn I. Marquis

[57] ABSTRACT

A method for accelerating the surface curing of a room temperature vulcanizable organopolysiloxane composition which comprises contacting the organopolysiloxane composition with carbon dioxide in excess of that present in the atmosphere.

7 Claims, No Drawings

METHOD FOR ACCELERATING SURFACE CURING OF ORGANOPOLYSILOXANE COMPOSITIONS

This application is a continuation-in-part application of pending application Ser. No. 767,940, filed on February 11, 1977 and now abandoned.

This invention relates to a method for accelerating the surface curing of organopolysiloxane compositions and more particularly to a method for accelerating the surface curing of room temperature vulcanizable (RTV) organopolysiloxane compositions.

Room temperature vulcanizable organopolysiloxanes are well known articles of commerce. In general these room temperature organopolysiloxane compositions include the two-component systems wherein the materials are admixed just prior to use and cure is spontaneous and the one-component systems which are stored in the absence of moisture, oxygen or some other material which acts to bring about the desired cross-linking reaction.

The one-component RTV organopolysiloxane compositions known heretofore include mixtures of diorganopolysiloxanes having reactive terminal groups or endblockers such as hydroxyl and alkoxy groups and amino substituted organosilicon compounds in which the amino groups are bonded to silicon through Si-N linkages.

In certain industrial applications, these one-component organopolysiloxanes have certain disadvantages. For example, these compositions cannot be used in assembly line applications as a sealant or as an adhesive because the time allotted at any one location or work station is not adequate to cure the composition. Even though the amino containing organopolysiloxane compositions cure within from 6 to 10 minutes, this is not rapid enough in, for example, an automotive assembly plant where surface cure times of from 10 to 60 seconds are necessary in order that the part may be assembled or stacked.

Therefore, it is an object of this invention to provide a method for accelerating surface curing of organopolysiloxane compositions. Another object of this invention is to provide a method for accelerating surface curing of room temperature vulcanizable organopolysiloxane compositions. A further object of this invention is to provide a method for accelerating surface curing of room temperature vulcanizable organopolysiloxane compositions containing aminosilicon compounds. These and other objects will be apparent from the following description.

SUMMARY OF THE INVENTION

The present invention relates to a method for accelerating surface curing of a room temperature vulcanizable organopolysiloxane composition which comprises contacting a composition containing (1) a diorganopolysiloxane having hydroxyl terminal groups or groups which are convertible to hydroxyl groups and (2) an amine substituted organosilicon compound containing at least three (3) amino groups per molecule in the presence of atmospheric moisture and carbon dioxide in excess of that present in the atmosphere.

DETAILED DESCRIPTION OF INVENTION

The diorganopolysiloxanes employed herein are not novel and can be any of the diorganopolysiloxanes having hydroxyl terminal groups or groups which are convertible to hydroxyl groups that have been employed heretofore in room temperature vulcanizable (RTV) compositions. Generally these organopolysiloxanes contain terminal hydroxyl groups and may be represented by the formula

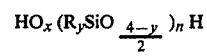

wherein each R is a monovalent radical selected from hydrocarbon and substituted hydrocarbon radicals, x has an average value of 0.99 to 1.01, y has an average value of 1.99 to 2.01, x+y=3, n is a number of at least 3 and preferably at least 50.

These siloxanes are known and have been fully described in U.S. Pat. Nos. 3,294,732; 3,127,363; 3,105,061 and others.

The siloxane polymers are essentially linear, hence are predominately (i.e., at least 90 mol percent) $R_2SiO$ units. However, limited proportions, preferably below 5 mol percent and more preferably below 2 mol percent of $R\,SiO_{3/2}$ units, $R_3SiO_{\frac{1}{2}}$ units and/or $SiO_{4/2}$ units can be present.

In the above formula, each R can be a monovalent hydrocarbon radical of up to 18 carbon atoms. Examples of radicals represented by R include alkyl radicals such as methyl, ethyl, n-propyl, isopropyl, dodecyl and octadecyl; alkenyl radicals such as vinyl, allyl, hexenyl and octadecenyl; cycloalkyl radicals such as cyclobutyl, cyclopentyl, cyclohexyl and cyclodecyl; cycloalkenyl radicals such as cyclobutenyl, cyclopentenyl, cyclohexenyl and cyclodecenyl; aryl radicals such as phenyl, xenyl, naphthyl and phenanthryl, aralkyl radicals such as benzyl, B-phenylethyl and xylyl, and alkaryl radicals such as tolyl and ethylphenyl.

The substituted hydrocarbon radicals represented by R include halogenohydrocarbon radicals such as o-, m- and p-chlorophenyl and bromophenyl radicals, a,a,a-trifluorotolyl, 3,3,3-trifluoropropyl, chloro-, fluoro- and bromo-derivatives of the various hydrocarbon radicals set forth above as well as cyanoalkyl radicals such as B-cyanoethyl, cyanopropyl, cyano-n-butyl, cyano-n-propyl and omega-cyanoctadecyl.

Preferably the radicals represented by R have less than 8 carbon atoms and more preferably R represents methyl radicals, phenyl, vinyl, ethyl, propyl and 3,3,3-trifluoropropyl radicals. Moreover, it is preferred that at least 50 mol percent of the R radicals should be aliphatic hydrocarbon radicals of not more than 4 carbon atoms. Of course, as is usually the case, the R radicals on a single silicon atom can be the same or different and various units in the siloxane chain can be the same or differently substituted, homopolymers (e.g., dimethylsiloxane polymers), copolymers (e.g., dimethylsiloxane-methylvinylsiloxane-, phenylmethylsiloxane polymers) and mixtures thereof. The siloxane polymers employed can vary from relatively mobile fluids (viscosity 50 cs. at 25° C.) to gum-like materials having viscosities in the range of $10^6$ cs. at 25° C. This can be seen from the value of n in the general formula above where n is at least 3 and is preferably at least 50 but can have a value as high as 2,000. The preferred siloxane polymers are those having viscosities in the range from 200 to 200,000 cs. at 25° C.

Other organopolysiloxanes which may be employed in this invention are the organopolysilioxane compositions which are prepared by reacting polymerizable organic monomers or mixtures of polymerizable organic monomers having aliphatic unsaturation with organopolysiloxanes in the presence of a free radical initiator. These compositions have been referred to as modified organopolysiloxanes and include the entire nonvolatile reaction product, including grafted organopolysiloxanes, organic homopolymers and copolymers, if any. The modified organopolysiloxanes are well known and their preparation has been described in U.S. Pat. Nos. 3,555,109, 3,776,875, 3,627,836, 3,631,087, 3,694,478 and others.

The siloxane polymer employed in the preparation of the modified organopolysiloxanes may be represented by the general formula

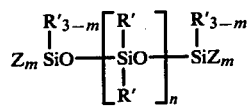

wherein $R'$ which may be the same or different represents monovalent hydrocarbon radicals or halogenated monovalent hydrocarbon radicals, $Z$ is a hydroxyl group or a group which is capable of being converted to a hydroxyl group, $m$ is a number of from 1 to 3 and $n$ is a number of at least 3 and preferably at least 50.

Examples of suitable monovalent hydrocarbon radicals represented by $R'$ are alkyl radicals having from 1 to 18 carbon atoms such as methyl, ethyl, propyl, butyl, hexyl, octyl, decyl, and octadecyl; aryl radicals such as phenyl, xenyl and naphthyl; alkaryl radicals such as tolyl and ethylphenyl; aralkyl radicals such as benzyl, B-phenylethyl and xylyl radicals. Suitable examples of halogenated hydrocarbon radicals are o-, m- and p-chlorophenyl and bromophenyl radicals, a,a,a-trifluorotolyl and 3,3,3-trifluoropropyl radicals. Preferably some of the radicals represented by $R'$ are lower alkyl radicals, i.e. alkyl radicals having from 1 to 4 carbon atoms since these are capable of forming free radicals or active sites.

Suitable siloxane polymers and copolymers which may be employed to form the modified organopolysiloxanes are hydroxyl-terminated siloxane fluids, such as methylphenylsiloxane fluids, dimethylpolysiloxane fluids, methylvinylsiloxane fluids, copolymers containing dimethylsiloxane and methyl-, phenyl-, or diphenyl-siloxane units.

The viscosity of the siloxane polymers used in preparing the modified organopolysiloxanes may vary over a wide range, i.e., from a fluid having a viscosity of from about 50 cs. at 25° C., up to a gum, preferably from about 100 up to 100,000 cs. at 25° C.

Any polymerizable organic monomer having aliphatic unsaturation may be reacted with the organosiloxane polymer. Examples of suitable olefinic compounds are low molecular weight straight-chain hydrocarbons, such as ethylene, propylene, butylene; vinyl halides, such as vinyl fluoride and vinyl chloride; vinyl esters, such as vinyl acetate, styrene, ring-substituted styrenes, and other aromatics, such as vinyl-pyridine and vinylnaphthalene; acrylic acid and derivatives of acrylic acid, including the salts, esters, amides, and acrylonitrile; N-vinyl compounds, such as N-vinylcarbazole, N-vinylpyrrolidone, and N-vinylcaprolactum; and vinylsilicon compounds, such as vinyltriethoxysilane.

Disubstituted ethylenes of the type $CH_2=CX_2$ may be used including vinylidene fluoride, vinylidene chloride, vinylidene cyanide, methacrylic acid, and compounds derived therefrom, such as the salts, esters, and amides as well as methacrolein, methacrylonitrile and the like.

Examples of disubstituted ethylenes of the type $CHX=CHX$, such as vinylene carbonate and various monomers which polymerize best in the presence of other monomers, e.g., maleic anhydride, esters of maleic and fumaric acids, stilbene, indene, and coumarone, may be used in the formation of these modified polymers. The monomers may be used singly or in combinations of two or three or even more.

The ratio of organosiloxane to polymerizable monomer having aliphatic unsaturation may vary within wide parameters. Generally, it is preferred that the weight ratio of organosiloxane to monomer be from 10:90 to 90:10 and more preferably from about 20:80 to 60:40.

In preparing the modified organopolysiloxanes, the reaction is most expeditiously conducted in the presence of free-radical initiators, normally organic peroxides, although azo-compounds may be used in which both the nitrogen atoms of the azo linkage are attached to a tertiary carbon atom, and the remaining valences of the tertiary carbon atom are satisfied by nitrile, carboxyl, cycloalkylene, or alkyl radicals, preferably having from 1 to 18 carbon atoms. In addition to the above mentioned initiators, ionizing radiation may also be used to bring about the formation of free radicals.

The most suitable peroxide initiators are compounds of the formula ROOH, ROOR or RCOOOR in which R is an organic radical. Specific examples of peroxides which are operative are hydroperoxides, such as t-butyl hydroperoxide, cumene hydroperoxide, and decalin hydroperoxide; dialkyl peroxides, such as di-t-butyl and dicumyl peroxide; cyclic peroxides, such as ascaridole and 1,5-dimethylhexane-1,5-peroxide; peresters, such as t-butyl perbenzoate, t-butylperoxy isopropyl carbonate, and t-butyl peroctoate; keto peroxides, such as acetone peroxide and cyclohexanone peroxide. Also, acyl peroxides and peracids may be used in the preparation of the modified organopolysiloxanes.

The amount of free radical initiator used is not critical and may range from as little as 0.05 percent of the more active peroxide initiators based on the weight of the monomer up to as much as 3 percent or even more of the initiator. Generally, it is preferred that not more than about 5 percent be employed.

The modified organopolysiloxanes may be prepared in the presence or absence of a polymerization medium which is non reactive with the polymerization components and the resultant modified organopolysiloxanes obtained from the polymerization reaction.

Suitable examples of liquids which may be used as a polymerization medium are organic solvents having a boiling range of from about 50° C. to 160° C. and having a relatively low chain-transfer constant. Suitable solvents are aromatic hydrocarbons, such as benzene, toluene, xylene; chlorinated aromatic hydrocarbons, such as chlorobenzene; aliphatic hydrocarbons, such as pentane, hexane, octane; cycloaliphatic hydrocarbons, such as 1,1-dimethylcyclopentane, cyclohexane, 1,1-dimethylcyclohexane, cycloheptane, cyclooctane, and the like. Esters such as methyl acetate, ethyl acetate, propyl acetate, butyl acetate, amyl acetate, isoamyl acetate, methyl propionate, methyl butyrate, ethyl butyrate, methyl valerate, methyl caproate, ethyl valerate, and the like may also be used as solvents.

Examples of other liquids which may be employed as the polymerization medium are water, methanol, saturated aliphatic fluoro- and chlorohydrocarbons in which three halogen atoms are bonded to at least one carbon atom such as 1,1,2,2-tetrafluorodichloroethane and monofluorotrichloroethane.

Also mixtures of several liquids which are inert towards the polymerization reactants and the products of the polymerization reaction may be employed.

The amount of polymerization medium employed may range from about 2 to about 50 percent, preferably from about 5 to 30 percent by weight based on the weight of the polymerization reactants and polymerization medium.

The temperature and pressure used in the polymerization reaction is not critical. The temperature may range from about 50° C. to about 200° C. while the pressure may range from 0.1 to 20 atmospheres. When the polymerization medium has a boiling point above the polymerization temperature employed and the monomers having aliphatic unsaturation have a boiling point above that of the polymerization medium, then the polymerization reaction can then be carried out at atmospheric pressure.

These modified organopolysiloxanes may be prepared in a semi-continuous, continuous or batch-wise process.

Any unreacted monomers containing aliphatic unsaturation and the polymerization medium can be removed at the end of the reaction by any conventional means. Distillation at from 1 to 500 mm Hg (abs.) and from 50° C. to 150° C. is preferred. Steam or a gas which is inert to the polymers and monomers such as nitrogen, can be passed through the reaction medium to aid in the removal of the unreacted monomers and inert liquid.

The room temperature vulcanizable organopolysiloxanes are prepared by mixing the organopolysiloxanes and/or modified organopolysiloxanes having hydroxyl groups with an amine substituted organosilicon compound having at least three (3) amine groups per molecule.

Amine substituted organosilicon compounds which may be employed are aminosilanes of the formula $R''_z Si(NY_2)_{4-z}$ or amino-silazanes of the formula

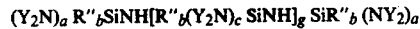
$(Y_2N)_a R''_b SiNH[R''_b(Y_2N)_c SiNH]_g SiR''_b (NY_2)_a$ wherein each $R''$ is an alkyl radical, aryl radical, aralkyl radical or alkaryl radical, each Y is a hydrogen atom, alkyl radical, aryl radical, cycloalkyl radical, alkaryl radical or aralkyl radical, a is 2 or 3, b is 0 or 1, c is 1 or 2, g is at least 1 and z is 0 or 1.

Aminosilanes employed contain 3 or 4 amino substituents per Si atom and 0 or 1 alkyl radical, aryl radical, alkaryl radical or aralkyl radical per Si atom. Thus tri- or tetrafunctional silanes are employed and the tetrafunctional silanes are more reactive hence will bring about a more rapid vulcanization than can be obtained with the trifunctional silanes. In general, the aminosilanes may be represented by the formula $R''Si(NY_2)_3$ and $Si(NY_2)_4$, where $R''$ is an alkyl radical such as methyl, ethyl, propyl or octadecyl, an aryl radical such as phenyl or anthracyl or an aralkyl radical such as benzyl or phenylethyl or an alkaryl radical such as the tolyl or xylyl radicals and each Y is H, or an alkyl, aryl, cycloalkyl, alkaryl or aralkyl radical as defined for $R''$. Mixtures of these aminosilanes can also be employed.

These aminosilanes may be prepared by known methods, such as reacting a silane containing hydrogen, a halogen or an alkoxy substituent with a primary or secondary amine. Suitable silane reactants include $SiCl_4$, $Si(OC_2H_5)_4$, $CH_3SiCl_3$, $CH_3Si(OC_3H_7)_3$, $C_6H_5Si(OCH_3)_3$, $C_6H_5SiCl_3$ and $C_6H_5SiH_3$. Suitable amine reactants include aliphatic, aromatic and araliphatic primary and secondary amines as well as ammonia. Operable amines include monobutyl amine, diethyl amine, aniline and methyl aniline.

The aminosilazanes which may be employed are prepared by known methods and are materials disclosed and discussed in the art.

Other amino substituted organosilicon compounds which may be employed are those obtained from the reaction of a halosilane and a monocycloalkylamine. The silane reactant may be illustrated by the formula $R''SiX_3$ where $R''$ is the same as above. The halogen atoms represented by X can be fluorine, chlorine, bromine or iodine.

Low Molecular weight siloxanes having at least three chlorine atoms per molecule bonded to silicon can be employed in the reaction with the cycloalkylamine. The organohalogensilane or siloxane is reacted with any monocycloalkylamine, preferably monocycloalkylamines having from 5 to 12 carbon atoms such as cyclopentylamine, cyclohexylamine, cycloheptylamine, 3,5,5-trimethylcyclo- and 2,3,4-triethylcyclohexylamine. Cyclohexylamine is the preferred cycloalkylamine.

The reactants can include mixtures of various silanes and various cycloalkylamines, hence the reaction is between at least one silane and at least one cycloalkylamine.

The reaction of the silane and the cycloalkylamine is carried forward in accordance with known procedures for reacting halosilanes with primary amines. Such procedures are described, for example, in U.S. Pat. Nos. 2,564,674, 2,579,417 and 2,579,418.

The reaction of the silane with the monocycloalkylamine to produce the desired silamines is best carried out in the substantial absence of water and in a solvent system. The solvent employed should, of course, be inert to the reactants. Examples of suitable solvents are toluene and methylene chloride. After the reaction has been completed as indicated by the cassation of precipitation of amine salts, the reaction product is separated from the amine salts by filtration or other means as desired. The solvent is removed from the reaction product preferably by distillation under reduced pressure to avoid or minimize the decomposition of the reaction product. The residue obtained is suitable for use as the amine substituted organosilicon compound.

The amine substituted organosilicon compounds are stored under essentially anhydrous conditions and are added to the siloxane polymer under essentially anhydrous conditions. These amine substituted organosilicon compounds are employed in amounts which will provide at least one gram equivalent silicon atom of the amine substituted organosilicon compound per gram equivalent of reactive and groups on the diorganopolysiloxane. Generally from 0.2 to 15 parts by weight of amine substituted organosilicon compound is added for each 100 parts by weight of the hydroxyl terminated organopolysiloxane polymer.

The order of addition of the various ingredients is optional, but the mixture should be prepared in an atmosphere substantially free of water.

In addition to the siloxane polymer and amine substituted organosilicon compound, the composition can contain additives such as compression-set additives, pigments, soluble dyes, aromatics (essential oils), oxidation inhibitors, heat stabilizers, flame retardants and light stabilizers, plasticizers and softeners such as trimethylsiloxy endblocked dimethylpolysiloxane fluds, reinforcing fillers and non-reinforcing fillers. Condensation catalysts such as disclosed in U.S. Pat. Nos. 2,843,555, 3,127,363, 3,082,527 and others, can be employed.

The compositions containing hydroxyl terminated organosiloxanes and/or modified organopolysiloxanes and an amine substituted organosilicon compound may be cured at room temperature up to about 150° C. in the presence of moisture.

Surprisingly, it has been found that surface curing of room temperature vulcanizable compositions may be accelerated by exposing the compositions to a gaseous medium containing moisture and carbon dioxide in excess of that present in the atmosphere. Thus, curing of the amine containing vulcanizable compositions can be accelerated by exposing the compositions to a gaseous medium containing at least 0.1 percent by volume of of carbon dioxide, preferably from 0.2 to about 50 percent by volume and more preferably from about 0.3 to about 10 percent by volume of carbon dioxide. Although a gaseous medium containing in excess of 50 percent by volume of carbon dioxide can be used, no particular advantages have been observed. Moreover, when the room temperature vulcanizable compositions are subjected to an atmosphere of moisture and carbon dioxide in excess of that present in the atmosphere under pressure, accelerated deep section curing is achieved. Thus the vulcanizable compositions may be placed, for example, in an autoclave containing moisture and carbon dioxide in excess of that present in the atmosphere and subjected to several pounds pressure.

With the process of this invention it is now possible to use room temperature vulcanizable compositions in automotive assembly plants for preparing formed-in-place gaskets. As soon as the vulcanizable material has been applied to the part and subjected to carbon dioxide and moisture, the part may be removed from the assembly line and assembled or stacked.

Various embodiments of this invention are further illustrated by the following examples in which all parts are by weight unles otherwise specified.

EXAMPLE 1

(a) A mixture containing 100 parts of hydroxyl terminated dimethylpolysiloxanes having a viscosity of 20,000 cs. at 25° C., 8 parts of hydrogenated castor oil, 40 parts of calcium carbonate, 50 parts of ground quartz, 8 parts of methyltris-(cyclohexylamino)silane and 0.5 part of N-beta-(aminoethyl)-gamma-aminopropyltrimethoxysilane is milled under anhydrous conditions and added to two molds; each being about 400 millimeters in thickness and about 25.4 millimeters in diameter. One mold sample is placed in a chamber where it is cured at room temperature in the presence of atmospheric moisture and carbon dioxide in an amount of about 50 percent by volume. A skin formed on the surface within about 30 seconds after exposure.

(b) In a comparison example, a molded sample is placed in a chamber and exposed to atmospheric moisture at room temperature. A skin formed on its surface within 8 to 10 minutes after exposure.

EXAMPLE 2

The mixture prepared in accordance with the procedure described in Example 1(a) is poured into several molds, each being about 400 millimeters in thickness and about 25.4 millimeters in diameter. One-half of the molded samples are placed in a chamber containing atmospheric moisture and the other half of the molded samples are placed in a chamber containing carbon dioxide and atmospheric moisture and cured at 24° C. At various time intervals, a molded sample is removed from each of the respective chambers and the depth of cure determined in millimeters. The results of these tests are illustrated in Table I.

TABLE I

| Cure Times - Hours | Air R.H. 40% | Air and $CO_2$ (50% by volume) R.H. 20% |
|---|---|---|
| 0.25 | 16 mm | 17 mm |
| 0.50 | 17 mm | 24 mm |
| 1.0 | 18 mm | 40 mm |
| 2.0 | 32 mm | 54 mm |
| 4.0 | 47 mm | 75 mm |
| 6.0 | 48 mm | 82 mm |
| 8.0 | 54 mm | 102 mm |
| 16.0 | 82 mm | 160 mm |
| 24.0 | 96 mm | 184 mm |

R.H. - Relative Humidity

EXAMPLE 3

(a) A mixture containing 100 parts of hydroxyl terminated dimethylpolysiloxanes having a viscosity of 4000 cs. at 25° C., 20 parts of trimethylsiloxy-terminated dimethylpolysiloxanes having a viscosity of 50 cs. at 25° C., 13 parts of fumed silica, 10 parts of methyltris-(cyclohexylamino)silane and 0.5 part of N-beta-(aminoethyl)-gamma-aminopropyltrimethoxysilane is milled under anhydrous conditions and added to a mold which is about 400 millimeters in thickness and about 25.4 millimeters in diameter. The molded sample is cured at room temperature in the presence of atmospheric moisture and carbon dioxide in amount of 50 percent by volume. A skin formed on the molded surface in about 20 to 25 seconds.

(b) In a comparison example, a molded sample prepared in accordance with Example 3(a) is exposed to atmospheric moisture at room temperature. A skin formed on the molded surface in from 6 to 8 minutes after exposure.

EXAMPLE 4

The mixture prepared in accordance with the procedure described in Example 3(a) is poured into several molds, each being about 400 millimeters in thickness and about 25.4 millimeters in diameter. One-half of the molded samples are placed in a chamber containing atmospheric moisture and the other half of the molded samples are placed in a chamber containing carbon dioxide and atmospheric moisture and cured at 24° C. At various time intervals, a molded sample is removed from the respective chambers and the depth of cure determined in millimeters. The results of these tests are illustrated in Table II.

TABLE II

| Cure Times - Hours | Air R.H. 90% | Air and CO₂ (50% by volume) R.H. 70% |
|---|---|---|
| .25 | 9 mm | 30 mm |
| .50 | 15 mm | 36 mm |
| 1.00 | 26 mm | 44 mm |
| 2.00 | 39 mm | 57 mm |
| 4.00 | 69 mm | 85 mm |
| 6.00 | 82 mm | 110 mm |
| 16.00 | 140 mm | 190 mm |
| 24.00 | 182 mm | 240 mm |

R.H. = Relative Humidity

EXAMPLE 5

(a) A modified organopolysiloxane is prepared by adding 250 parts of styrene, 200 parts of butyl acrylate and 4.5 parts of 1,1-di-t-butylperoxy- 3,3,5-trimethylcyclohexane dissolved in mineral spirits to a reactor containing 309 parts of a hydroxyl terminated dimethylpolysiloxane fluid having a viscosity of 4,000 cs. at 25° C. and 50 parts of water and thereafter heating the reactants under a nitrogen atmosphere for 7 hours at a temperature of from about 90° to 100° C. The volatile materials are removed by vacuum stripping at about 120° C. at less than 1 mm for about 2 hours yielding a white liquid product.

(b) A mixture containing 100 parts of the product prepared in accordance with Example 5(a) is mixed with 8 parts of methyltris-(sec-butylamino)silane and 0.5 part of N-beta-(aminoethyl)-gamma-aminopropyltrimethoxysilane, milled under anhydrous conditions and added to several molds, each being about 400 millimeters in thickness and about 25.4 millimeters in diameter. One-half of the molded samples are placed in a chamber and exposed at room temperature to atmospheric moisture and carbon dioxide. The other half of the molded samples are placed in a chamber and exposed to atmospheric moisture at room temperature. At various time intervals, a molded sample is removed from each of the respective chambers and the depth of the cure determined in millimeters. The results of these tests are illustrated in Table III.

TABLE III

| Cure Times - Hours | Air R.H. 40% | Air R.H. 90% | Air and CO₂ (50% by volume) R.H. 20% | Air and CO₂ (50% by volume) R.H. 90% |
|---|---|---|---|---|
| 0.25 | None | 8 mm | 11 mm | 13 mm |
| 0.50 | 5 mm | 16 mm | 15 mm | 18 mm |
| 1.0 | 13 mm | 26 mm | 19 mm | 26 mm |
| 2.0 | 22 mm | 34 mm | 26 mm | 35 mm |

R.H. = Relative Humidity

EXAMPLE 6

The procedure of Example 1(a) is repeated, except that 8 parts of methyltris-(dibutylamino)silane is substituted for methyltris-(cyclohexylamino)silane and thereafter exposed at room temperature to atmospheric moisture and carbon dioxide in an amount of 50 percent by volume. Skin formation is observed after about 50 seconds.

EXAMPLE 7

The procedure of Example 1(a) is repeated, except that 8 parts of methyl tris-(diethylamino)silane is substituted for methyltris-(cyclohexylamino)silane. Skin formed on the surface of the resultant composition in about 40 seconds after being exposed at room temperature in the presence of atmospheric moisture and carbon dioxide in an amount of 50 percent by volume.

EXAMPLE 8

The procedure of Example 3 is repeated, except that 10 parts of phenyltris-(cyclohexylamino)silane is substituted for methyltris-(cyclohexylamino)silane. Skin formed on the surface of the composition in about 25 seconds after being exposed at room temperature to atmospheric moisture and carbon dioxide in an amount of 50 percent by volume.

EXAMPLE 9

A mixture containing 100 parts of hydroxyl terminated dimethylpolysiloxanes having a viscosity of 4000 cs. at 25° C., 20 parts of a trimethylsiloxy-terminated dimethylpolysiloxanes having a viscosity of 50 cs. at 25° C., 16 parts of fumed silica, 5 parts of diisodecyladipate and 8 parts of tris-cyclohexylaminosilane is milled under anhydrous conditions and added to several molds which are about 400 millimeters in thickness and about 25.4 millimeters in diameter. The molded samples are placed in chambers containing various concentrations of carbon dioxide and cured at 25° C. and at 42 percent relative humidity. The time required for the samples to become tack-free is illustrated in Table IV.

TABLE IV

| Sample No. | Percent CO₂ (Volume) | Tack-Free Time (Minutes) |
|---|---|---|
| 1 | 0.06 | 21 |
| 2 | 0.22 | 14 |
| 3 | 0.45 | 10 |
| 4 | 0.55 | 5 |
| 5 | 0.7 | 4 |
| 6 | 1.15 | 3 |
| 7 | 1.35 | 3 |

Although the present invention has been defined with specific reference to the above examples, it should be understood that these examples are given merely for purposes of illustration and that other variations which will become apparent to those skilled in the art are to be included within the scope of this invention.

What is claimed is:

1. A method for accelerating surface curing of a composition which is vulcanizable at room temperature in the presence of atmospheric moisture which comprises exposing a composition containing hydroxyl terminated organopolysiloxanes and an aminosilicon compound selected from the group consisting of aminosilanes of the formula $$R''_z Si(NY_2)_{4-z}$$

and aminosilazanes of the formula $$(Y_2N)_a R''_b SiNH[R''_b (Y_2N)_c SiNH]_g SiR''_b (NY_2)_a$$

in which R'' is selected from the group consisting of alkyl, aryl, aralkyl and alkaryl radicals, Y is selected from the group consisting of hydrogen, alkyl, aryl, cycloalkyl, alkaryl and aralkyl radicals, z is 0 or 1, g is at least 1, a is 2 or 3, b is 0 or 1 and c is 1 or 2 to a gaseous medium containing moisture and carbon dioxide in which the carbon dioxide is present in an amount of at least 0.1 percent by volume.

2. The method of claim 1, wherein the hydroxyl terminated organopolysiloxanes are represented by the formula $$HO_x(R_ySiO_{\frac{4-y}{2}})_n H$$

wherein R is selected from the group consisting of monovalent hydrocarbon radicals and substituted monovalent hydrocarbon radicals, x has an average value of 0.99 to 1.01, y has an average value of 1.99 to 2.01, x+y=3 and n is a number of at least 3.

3. The method of claim 1, wherein the hydroxyl terminated organopolysiloxanes are modified organopolysiloxanes which are obtained by polymerizing an organic monomer in the presence of a hydroxyl terminated diorganopolysiloxane and a free radical initiator.

4. The method of claim 1, wherein the carbon dioxide is present in the gaseous medium in an amount of from 0.2 to about 50 percent by volume.

5. The method of claim 1, wherein the amino substituted organosilicon compound is an aminosilane of the formula $$R''_z Si(NY_2)_{4-z}$$

in which R'' is selected from the group consisting of alkyl, aryl, aralkyl and alkaryl radicals, Y is selected from the group consisting of hydrogen, alkyl, aryl, cycloalkyl, alkaryl and aralkyl radicals, and z is 0 or 1.

6. The method of claim 5 wherein the aminosilane is an alkyl-tris:(cyclohexylamino)silane.

7. The method of claim 6 wherein the aminosilane is methyltris-(cyclohexylamino)silane.

* * * * *